United States Patent [19]
Lubieniecki et al.

[11] Patent Number: 5,698,122
[45] Date of Patent: Dec. 16, 1997

[54] DUAL SWITCH FOR SEMI AUTOMATIC WELDING GUN

[75] Inventors: Victor Lubieniecki, Lansing; James W. Lyall, New Lenox; William Knippel, Jr., Mokena, all of Ill.

[73] Assignee: The Miller Group Ltd., Appleton, Wis.

[21] Appl. No.: 567,305

[22] Filed: Dec. 5, 1995

[51] Int. Cl.⁶ .................................................. B23K 9/173
[52] U.S. Cl. ............................. 219/137.31; 200/43.17
[58] Field of Search ........................... 219/137.31, 132; 200/43.11, 43.17, 43.19, 43.21

[56] References Cited

U.S. PATENT DOCUMENTS

| | | |
|---|---|---|
| 2,658,132 | 11/1953 | Welch ........................ 219/132 |
| 3,283,121 | 11/1966 | Bernard et al. . |
| 3,428,778 | 2/1969 | Blackman et al. . |
| 3,469,070 | 9/1969 | Bernard et al. . |
| 3,689,733 | 9/1972 | Matasovic . |
| 3,854,020 | 12/1974 | Glover et al. .................. 200/43.17 |
| 4,250,366 | 2/1981 | Erickson et al. . |
| 4,608,482 | 8/1986 | Cox et al. ....................... 219/132 |

Primary Examiner—Clifford C. Shaw
Attorney, Agent, or Firm—Mark W. Croll; Thomas W. Buckman; John P. O'Brien

[57] ABSTRACT

A dual switch for a semi automatic welding gun has a switch lever that pivots between three positions. At the first position, the switch lever is disengaged from a first switch so that the welding gun is "off". In the second position, the switch lever engages the first switch to turn the gun "on". A locking lever retains the switch lever in its second position. Pivoting the switch lever to its third position releases the locking lever to enable the switch lever to return, under a spring bias, to its first position. A second switch is independent of the first switch and is selectively actuated to vary the welding schedule while the gun is either "on" or "off".

9 Claims, 4 Drawing Sheets

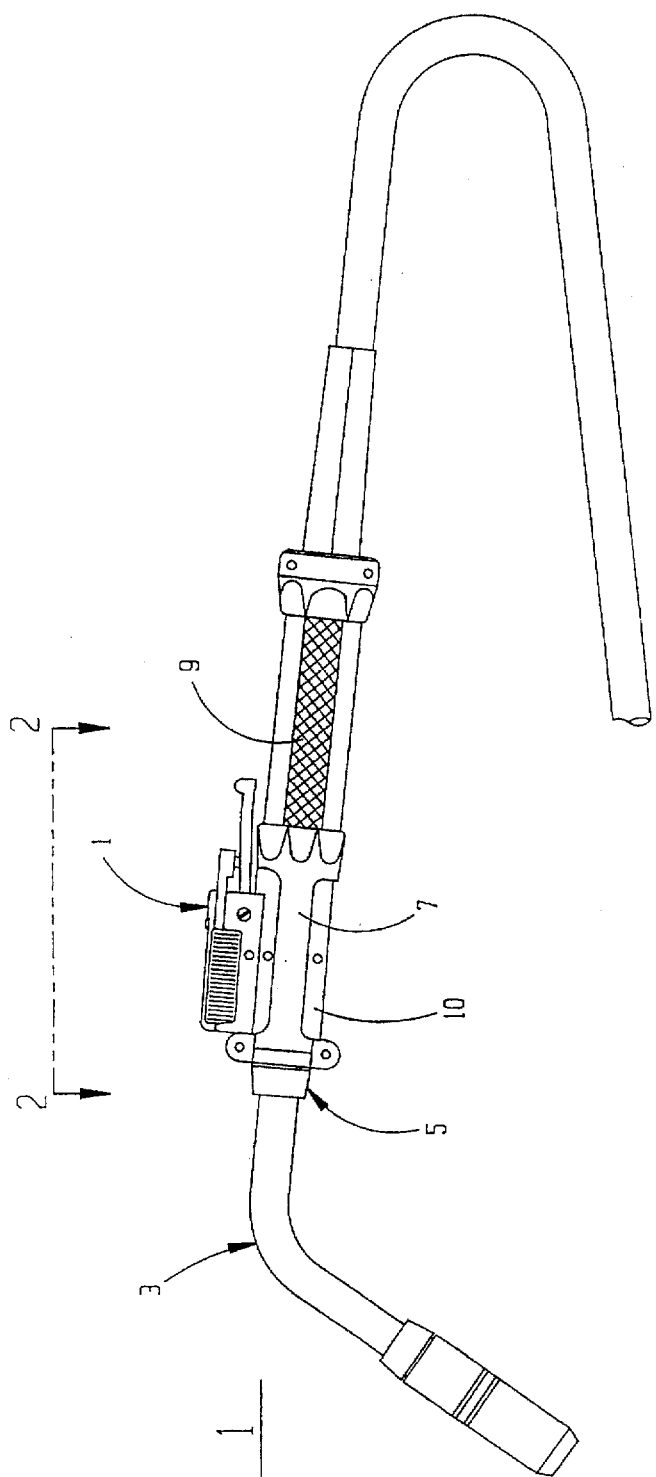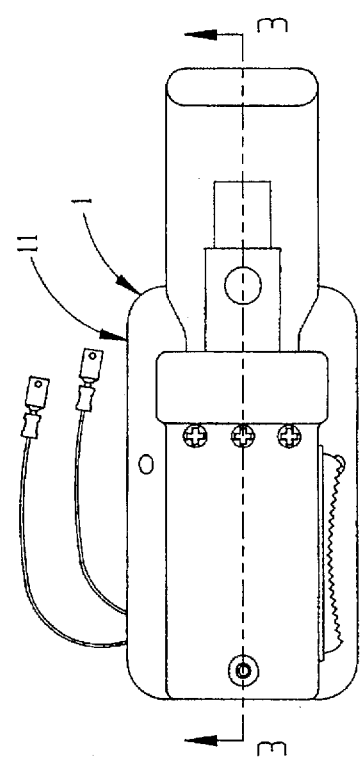

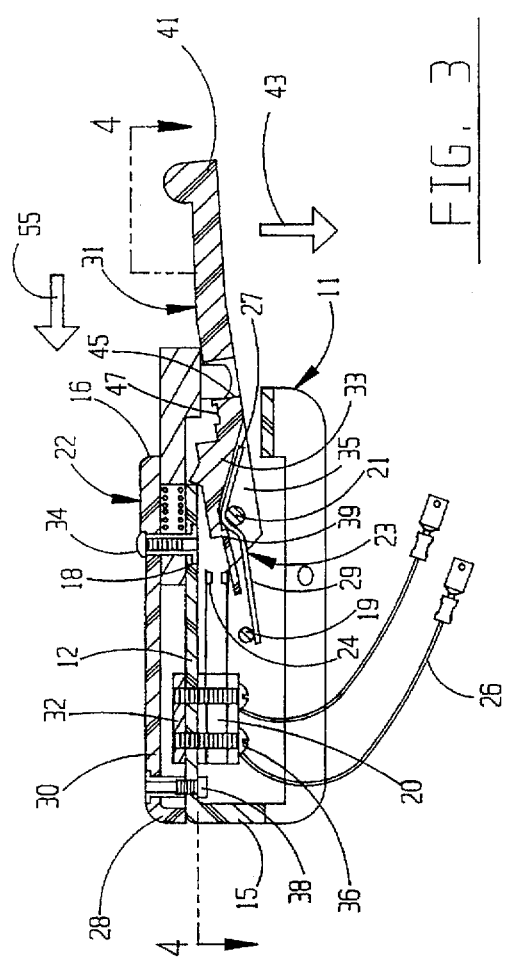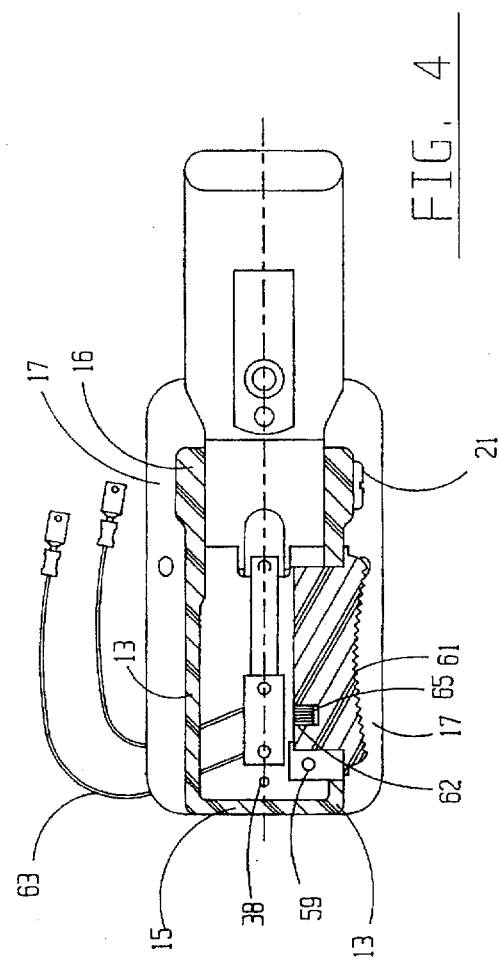

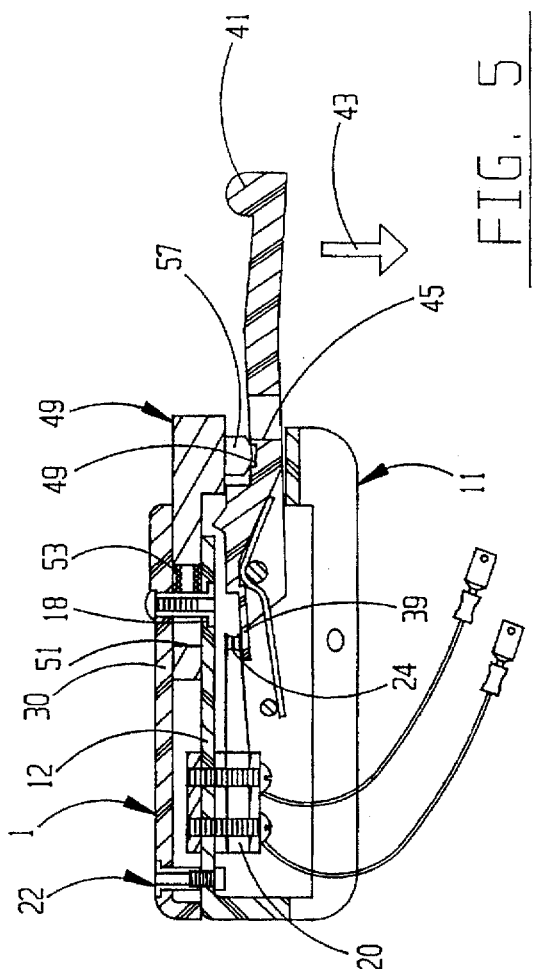
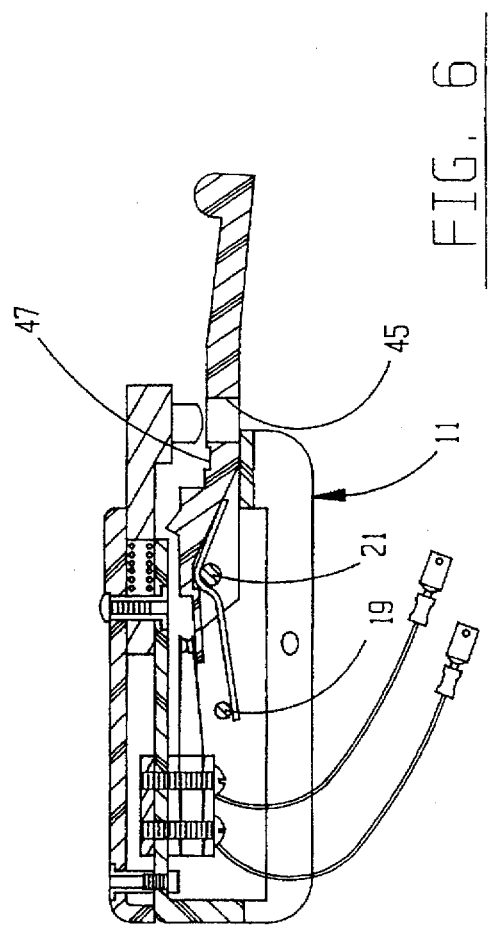

DUAL SWITCH FOR SEMI AUTOMATIC WELDING GUN

BACKGROUND OF THE INVENTION

1. Field of the Invention

This invention pertains to wire welding, and more particularly to apparatus that controls a semi automatic welding process from a wire welding gun.

2. Description of the Prior Art

Semi automatic welding includes submerged arc welding (SAW), gas metal arc welding (GMAW) also known as MIG welding, and flux cored arc welding (FCAW). The process of semi automatic welding is desirably controlled to a great extent from the welding gun. For that reason, it is known to mount a control switch on the gun handle. Such a switch enables the person operating the welding machine to turn the welding current on and off from the handle.

A prior semi automatic welding gun switch A as shown in FIGS. 7, 7A, and 7B had a trigger lever B that was connected at one end C to a housing D by a fastener E. A plate F was also connected by the fastener E to the housing D. The trigger lever B was bendable about the fastener E between an "off" position as shown in FIG. 7 and an "on" position as shown in FIG. 7A. In the "on" position, the trigger lever B pressed the plate F against the button G of a switch H. The trigger lever was also slidable over the fastener E in the direction of arrow I to lock the plate against the switch button G, FIG. 7B. With the trigger lever in the "locked on" position, a person could remove his hand from the switch, but the gun would continue to operate.

The prior semi automatic welding gun switch A was not entirely satisfactory. One problem associated with it was that it was difficult to manipulate the trigger lever B between the "on" and "locked on" positions by a person wearing gloves.

Another disadvantage of the prior semi automatic welding gun switch A was the difficulty of using it to vary welding schedules. The trigger lever B had an intermediate position between the "on" and "off" positions. When the trigger lever was in its intermediate position, it actuated the switch contacts, which were supplied by three wires from the welding machine control, to cause the welding machine to produce a different welding schedule than when the trigger lever was in its "on" position. However, it was difficult for a person wearing gloves to feel the intermediate position of the trigger lever.

SUMMARY OF THE INVENTION

In accordance with the present invention, a dual switch for a semi automatic welding gun is provided that reliably controls both the "on" and "off" function and changes in welding schedules. This is accomplished by apparatus that includes two separate switches that are independently operable from the welding gun.

The two switches are assembled in a housing that in turn is mounted to a handle of the welding gun. The first switch controls the "on-off" function of the welding process. The first switch comprises normally open contacts and has two wires dedicated to it. A switch lever is pivotable within the housing between three positions. In the first position, the switch lever is disengaged from the first switch contacts so they are open. A first spring biases the switch lever to its first position. In the second and third positions, the switch lever is engaged with the first switch contacts to close them.

The switch lever is lockable in the second position thereof by a locking lever that is reciprocable within the housing between first and second locations. When the locking lever is in its first location, a pin on the locking lever is aligned with a hole in the switch lever. By receiving the locking lever pin, the hole enables the first spring to pivot the switch lever to its first position. A second spring biases the locking lever to its first location.

When the locking lever is in its second location, the locking lever retains the switch lever in its second position, thereby locking the first switch contacts in their closed mode. For that purpose, the switch lever includes a detent engaged by the locking lever pin when the locking lever is in its second location.

Pivoting the switch lever to its third position withdraws the detent from the locking lever pin and enables the second spring to translate the locking lever to its first location such that the locking lever pin is aligned with the switch lever hole. Then releasing the switch lever enables the first spring to pivot the switch lever to its first position. In that manner, the person can turn a welding gun "on" by pivoting the switch lever to its second position. When the switch lever is in its second position, the person can lock it there by pushing the locking lever with his thumb to its second location. Pivoting the switch lever to its third position causes the locking lever to translate to its first location and enables the switch lever to pivot to its first position and turn the welding gun "off".

Further in accordance with the present invention, the second switch has two wires dedicated to it. A slider is slideable in the housing between first and second stations. At the first station, the slider actuates the second switch to control the welding machine to produce a first welding schedule. Sliding the slider to a second station controls the welding machine to produce a second welding schedule. The second switch is thus operable to selectively change welding schedules independently of any operation of the first switch.

The method and apparatus of the invention, using two switches, provides simple and reliable control of a wire welding machine from the welding gun. The first switch control the "on-off" function, and the second switch independently varies the welding schedule.

Other advantages, benefits, and features of the present invention will become apparent to those skilled in the art upon reading the detailed description of the invention.

BRIEF DESCRIPTION OF THE DRAWINGS

FIG. 1 is a front view of a semi automatic wire welding gun that includes the present invention.

FIG. 2 is a view on an enlarged scale taken along line 2—2 of FIG. 1.

FIG. 3 is a cross sectional view taken along line 3—3 of FIG. 2 showing the switch lever in a first position.

FIG. 4 is a cross sectional view taken along line 4—4 of FIG. 3.

FIG. 5 is a view similar to FIG. 4, but showing the switch lever in a second position.

FIG. 6 is a view similar to FIG. 5, but showing the switch lever in a third position.

DETAILED DESCRIPTION OF THE INVENTION

Figure 7:
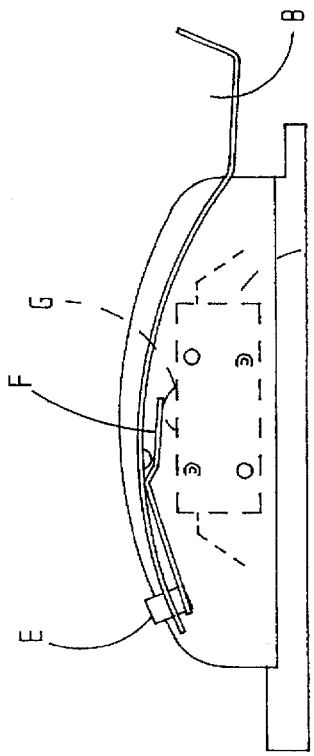
FIG. 7 is a simplified view of a prior semi automatic welding gun switch shown in the "off" position.
Figure 7A:
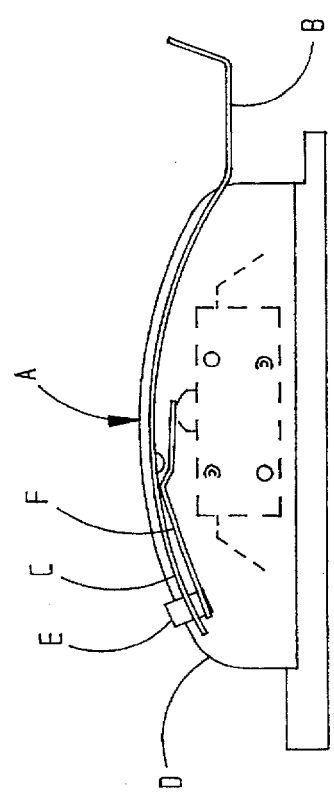
FIG. 7A is a view similar to FIG. 7, but showing the prior semi automatic welding gun switch in the "on" position.
Figure 7B:
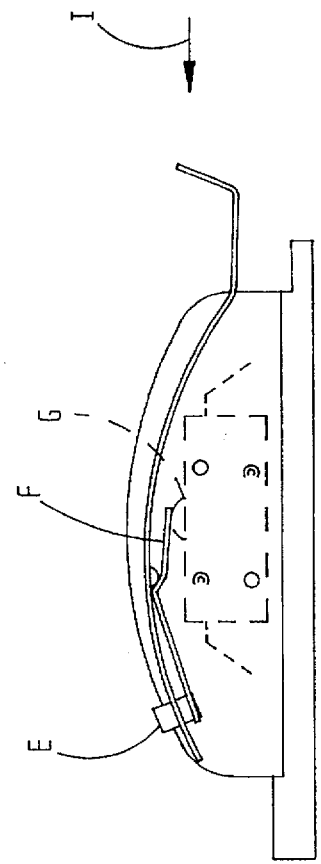
FIG. 7B is a view similar to FIG. 7A, but showing the prior semi automatic welding gun switch in the "locked on" position.

Although the disclosure hereof is detailed and exact to enable those skilled in the art to practice the invention, the physical embodiments herein disclosed merely exemplify the invention, which may be embodied in other specific structure. The scope of the invention is defined in the claims appended hereto.

Referring to FIG. 1, a dual switch 1 for a semi automatic welding gun 3 is illustrated. As illustrated, the semi automatic welding gun 3 has a handle 5 to which the dual switch 1 is mounted. The handle 5 includes a barrel section 7 and a hand grip 9. The hand grip 9 makes an angle of approximately 7.3 degrees with the barrel section 7. The barrel section 7 has opposed partial cylindrical surfaces 10.

Looking also at FIGS. 2-4, the dual switch assembly 1 is comprised of a housing 11 that is fabricated with a top wall 12, two side walls 13, and an end wall 15. The end 16 of the housing 11 opposite the end wall 15 is open. Arcuate flanges 17 extend oppositely from the respective side walls 13. The flanges 17 conform to the contour of the partial cylindrical surfaces 10 of the gun barrel section 7. Extending between the side walls 13 of the housing 11 are a reaction pin 19 and a pivot pin 21. One or more flanged nuts 18 are pressed into and upstand from the housing top wall 12 at the housing open end 16.

A first switch 20 is assembled to the housing top wall 12. Screws 36 and a tapped plate 32 hold the first switch 20 in place. The first switch 20 has a pair of normally open contacts 24 and two wires 26 leading to it from the wire welding machine control, not illustrated in the drawings.

A cover 22 is joined to the housing top wall 12. The cover 22 has a short peripheral wall 28 and a top wall 30. The cover 22 is joined to the housing 11 by screws 34 that engage the nuts 18, and by another screw and nut 38 near the housing end wall 15.

A switch lever 31 has a first end 41 and a second end formed as a channel composed of a middle leg 33 and two side legs 35. There are a pair of aligned holes in the side legs 35. A tab 39 projects from the switch lever middle leg 33. The switch lever 31 pivots with respect to the housing 11 by means of the pivot pin 21 passing through the holes in the side legs 35.

A leaf spring 23 has a curved middle portion and two oppositely extending leaves 27 and 29. The curved portion of the spring 23 is interposed between the pivot pin 21 and the switch lever middle leg 33. The spring first leaf 27 is also against the switch lever middle leg. The second leaf 29 of the leaf spring is placed against the reaction pin 19. The result is that the spring 23 biases the switch lever to a first position as shown in FIG. 3.

The switch lever 31 defines a hole 45 therethrough midway between its ends. There is a shallow detent 47 close to the hole 45; the hole is between the detent and the switch lever first end 41.

An external force can be exerted on the switch lever first end 41 in the direction of arrow 43. The external force pivots the switch lever against the force of the leaf spring 23 to a second position as shown in FIG. 5. When the switch lever is in its second position, the tab 39 engages and closes the contacts 24 of the switch 20.

The dual switch 1 further comprises a locking lever 49. The locking lever 49 is in the form of a bar that slides between the housing top wall 12 and the cover top wall 30. The locking lever has a slot 51 that fits over one of the nuts 18 upstanding from the housing top wall. A compression spring 53 within the slot 51 biases the locking lever outwardly of the housing 11 and cover 22, that is, to the right with respect to FIGS. 3 and 5. The spring 53 biases the locking lever to a first location as shown in FIG. 3. A manual force can be exerted in the direction of arrow 55 to overcome the spring 53 and translate the locking lever to a second location as shown in FIG. 5.

Depending from the locking lever 49 is a pin 57. When the locking lever is in the first location thereof, the pin 57 registers with the hole 45 in the switch lever 31. Consequently, the switch lever is free to pivot to its first position under the force of the leaf spring 23.

When the locking lever 49 is translated to its second location, the pin 57 is aligned with the detent 47 in the switch lever 31. In that situation, the switch lever is retained in its second position by the locking lever pin, FIG. 5.

To release the switch lever 31 from being retained in its second position by the locking lever 49, the switch lever is pivoted to a third position by application of an external force to its first end 41 in the direction of arrow 43, FIG. 6. Doing so causes the detent 47 to withdraw from the pin 57. The spring 53 is then able to translate the locking lever to its first location. The pin is then aligned with the hole 45 in the switch lever. Removing the external force from the switch lever causes the leaf spring 23 to pivot the switch lever back to its first position, FIG. 3, thereby opening the switch 20.

Further in accordance with the present invention, an independent second switch 59 is incorporated into the dual switch 1. The second switch 59 is a two position switch, and it has two wires 63 leading to it from the welding machine control. The second switch is actuated by a slider 61, which is sideably captured between the housing 11 and the cover 22. The slider 61 has a notch 62 that receives an actuating button 65 of the switch. Sliding the slider 61 to opposite end stations causes the switch 59 to actuate.

In operation, the first switch 20 functions as an "on-off" switch for the welding gun 3. When the switch lever 31 is in its first position (FIG. 3), the first switch contacts 24 are open, and the gun is "off". By squeezing the switch lever first end 41 between his hand and the gun handle 5, a person pivots the switch lever to its second position (FIG. 5) and thereby turns the gun "on". To lock the gun in the "on" position, the person squeezes the switch lever to the third position thereof (FIG. 6) and pushes the lock lever to its second location with his thumb. The person can then let go of the switch lever. The leaf spring 23 biases the switch lever back to its second position (FIG. 5), where it remains because of the pin 57 in the detent 47 to keep the gun "on".

The second switch 59 is wired to the welding machine control such that it functions to vary the welding schedule. Any time the gun is "on", the slider 61 can be slid to actuate the second switch. In that manner, the welding schedule can be changed during the welding process without having to alter the switch lever 31. Further, the slider and second switch enable welding schedules to be pre-set before starting the welding process.

When the person wants to turn the gun 3 "off" from its "locked on" position, he squeezes the switch lever 31 to its third position (FIG. 6), thereby withdrawing the detent 47 from the locking lever pin 57. The spring 53 translates the locking lever 49 back to its first location such that the pin aligns with the switch lever hole 45. When the person lets go of the switch lever, the leaf spring 23 pivots the switch lever to its first position, thereby opening the switch contacts 24 and turning the welding gun "off".

Thus, it is apparent that there has been provided, in accordance with the invention, a dual switch for a semi automatic welding gun that fully satisfies the aims and advantages set forth above. While the invention has been described in conjunction with specific embodiments thereof, it is evident that many alternatives, modifications, and variations as to sizes, shapes, and materials will be apparent to those skilled in the art in light of the foregoing description. Accordingly, it is intended to embrace all such alternatives, modifications, and variations as fall within the spirit and broad scope of the appended claims.

We claim:

1. A switch for a semi automatic welding gun comprising:
  a. a housing mountable to the semi automatic welding gun;
  b. first switch means in the housing for selectively opening and closing an electrical circuit;
  c. a switch lever for pivoting within the housing between a first position whereat the switch lever is disengaged from the first switch means to open the electrical circuit and a second position whereat the switch lever engages the first switch means to close the electrical circuit, the switch lever including first spring means for biasing the switch lever to the first position thereof; and
  d. lock means for selectively locking the switch lever in the second position thereof, the lock means comprising a locking lever reciprocable within the housing between a first location whereat the locking lever enables the first spring means to bias the switch lever to the first position thereof and a second location whereat the locking lever retains the switch lever in the second position thereof.

2. The switch of claim 1 wherein the lock means further comprises second spring means for biasing the locking lever to the first location thereof.

3. The switch of claim 1 wherein:
  a. the lock means further comprises a pin in the locking lever;
  b. the switch lever defines a detent and a hole;
  c. the pin in the locking lever enters the detent in the switch lever when the locking lever is in the second location thereof to retain the switch lever in the second position thereof; and
  d. the pin in the locking lever enters the hole in the switch lever when the locking lever is in the first location thereof to enable the first spring means to pivot the switch lever to the first position thereof.

4. The switch of claim 3 wherein the switch lever is pivotable to a third position whereat the detent therein withdraws from the pin in the locking lever to enable the second spring means to translate the locking lever to the first location thereof and thereby enable the first spring means to pivot the switch lever to the first position thereof.

5. The switch of claim 1 further comprising:
  a. second switch means in the housing for controlling the electrical circuit between first and second operating schedules; and
  b. slider means for selectively actuating the second switch means independently of the first switch means to control the electrical circuit between the first and second operating schedules.

6. The switch of claim 5 wherein the first switch means has first dedicated wires thereto from the electrical circuit, and wherein the second switch means has second dedicated wires thereto from the electrical circuit independent of first wires to the first switch means.

7. In combination with a handle for a semi automatic welding gun, a dual switch assembly for controlling the gun comprising:
  a. first switch means having a first pair of wires dedicated thereto for selectively turning the welding gun "on" and "off", the first switch comprising:
    1. a first pair of contacts;
    2. a switch lever pivotable within the housing means between a first position whereat the switch lever disengages the first pair of contacts to turn the welding gun "off" and a second position whereat the switch lever engages the first pair of contacts to turn the welding gun "on"; and
    3. lock means reciprocable within the housing means between a first location whereat the lock means enables the switch lever to pivot from the second to the first positions thereof, and a second location whereat the lock means retains the switch lever in the second position thereof;
  b. second switch means having a second pair of wires dedicated thereto for altering the operating schedule of the welding gun; and
  c. housing means mounted to the welding gun handle for assembling the first and second switch means thereto.

8. The combination of claim 7 wherein the switch lever is biased to the first position thereof, and wherein the lock means is biased to the first location thereof.

9. The combination of claim 7 wherein the second switch means comprises:
  a. a second pair of contacts; and
  b. a slider slideable within the housing means between a first station whereat the slider actuates the second pair of contacts to produce a first operating schedule for the welding gun, and a second station whereat the slider actuates the second pair of contacts to produce a second operating schedule for the welding gun.

* * * * *